Dec. 26, 1950  G. E. BURKS ET AL  2,535,388
TRANSMISSION COUPLING DEVICE
Filed Jan. 22, 1947  3 Sheets-Sheet 1
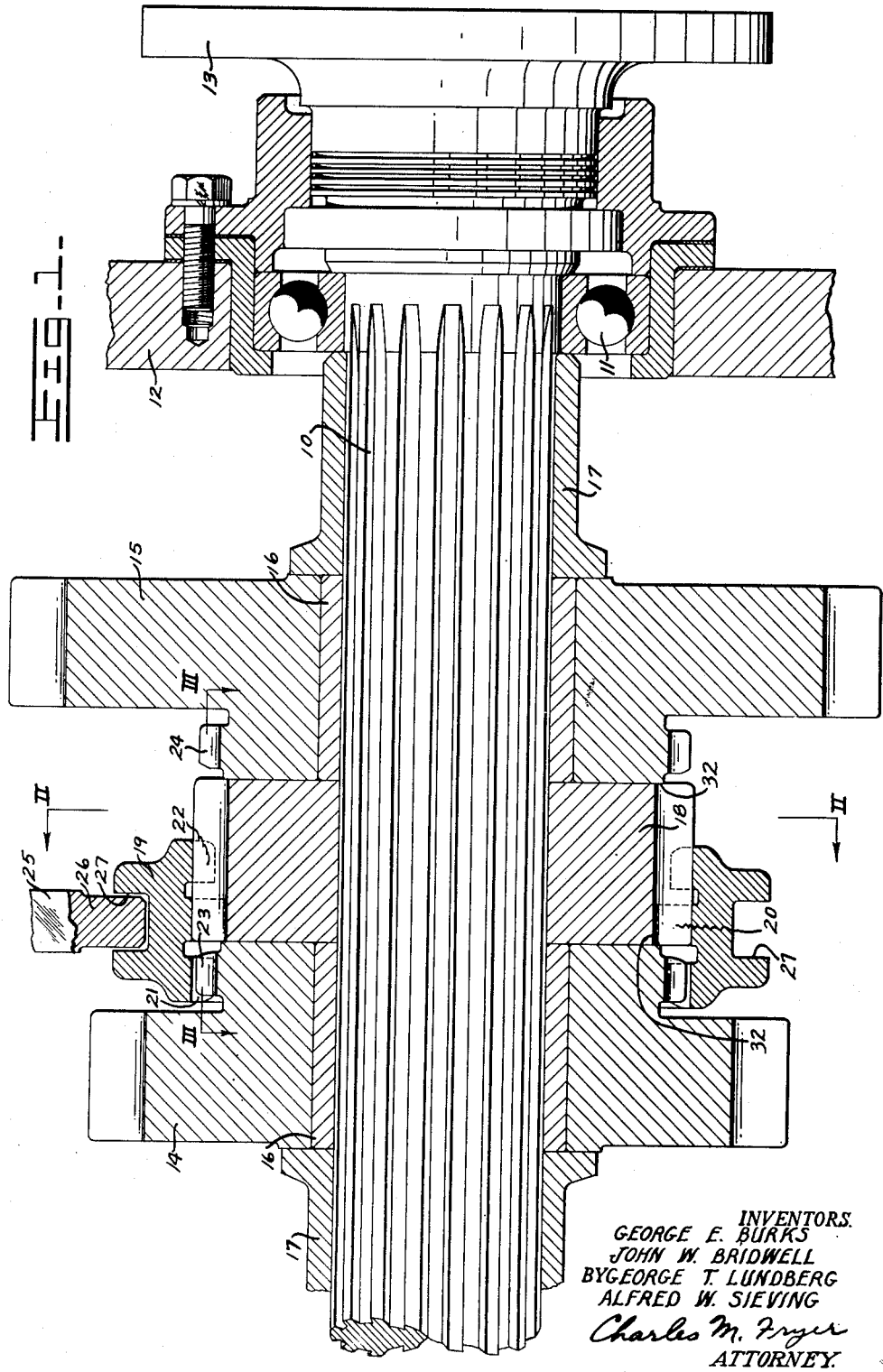
INVENTORS.
GEORGE E. BURKS
JOHN W. BRIDWELL
BY GEORGE T. LUNDBERG
ALFRED W. SIEVING
Charles M. Fryer
ATTORNEY.

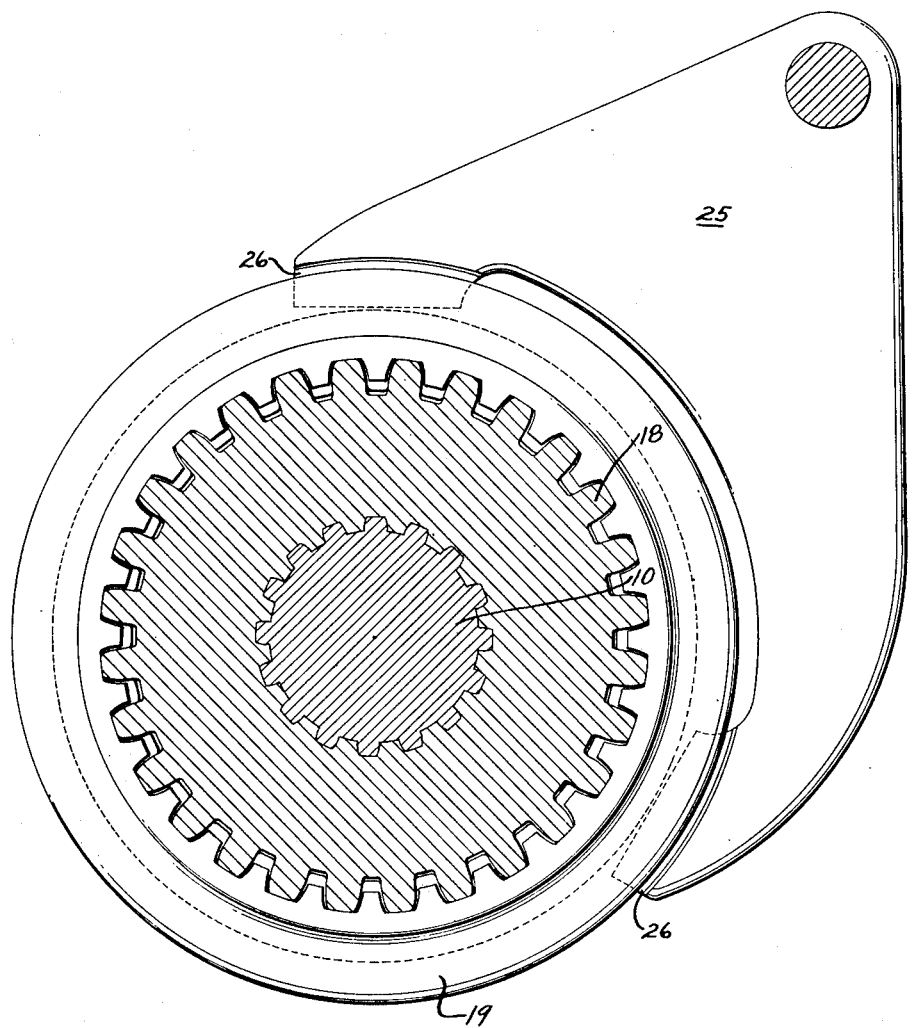

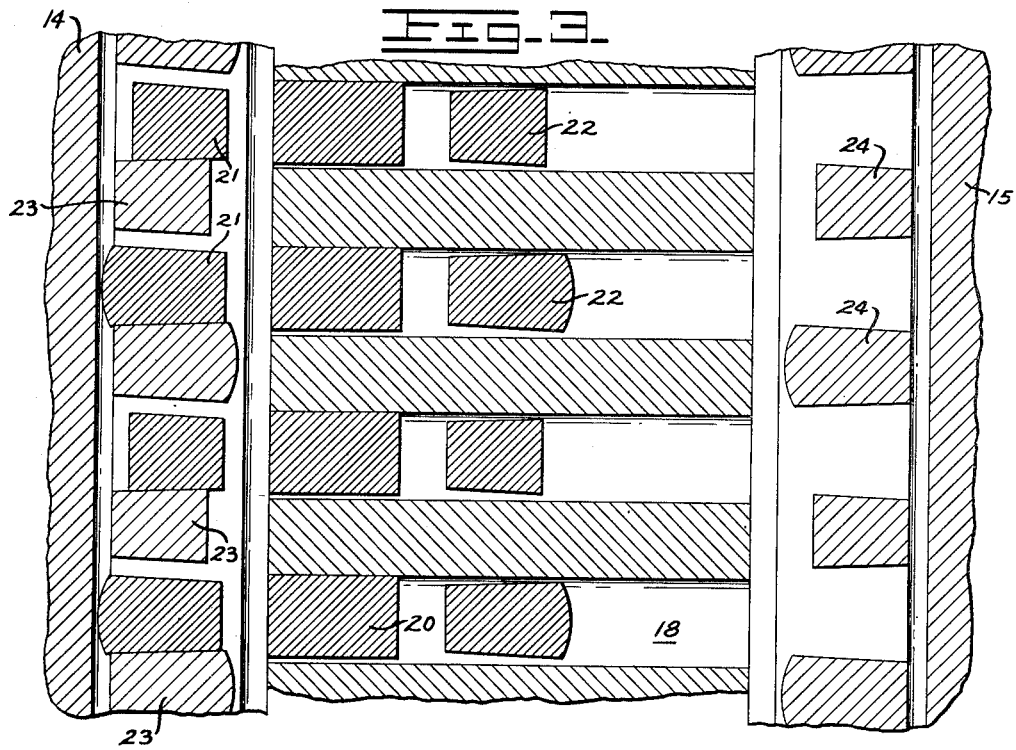

Patented Dec. 26, 1950

2,535,388

UNITED STATES PATENT OFFICE 2,535,388

TRANSMISSION COUPLING DEVICE

George E. Burks, John W. Bridwell, George T. Lundberg, and Alfred W. Sieving, Peoria, Ill., assignors to Caterpillar Tractor Co., San Leandro, Calif., a corporation of California Application January 22, 1947, Serial No. 723,514

7 Claims. (Cl. 192—67)

1

The present invention relates to transmission coupling devices and particularly to an improved coupling device for use in connection with transmissions of the constant mesh type wherein a change of gear ratios is accomplished by selectively connecting different gears to a driving shaft.

It is conventional practice to employ a coupling collar or clutch-like device engageable by movement in opposite directions with either of two transmission gears to form a driving connection between the drive shaft and the selected gear. Due to vibration present in most transmissions and to the varying load to which the gears and coupling members are subjected, it has been a common fault of such coupling collars to slip or work their way out of engagement during operation. This disengagement or so-called "slipping out of gear" frequently occurs because of variation in the direction of the driving force. For example, in an automobile the engine is normally driving the drive shaft through the transmission, but on an uneven surface or under other variable load conditions the automobile is coasting intermittently and often exceeding the driving speed of the engine. Consequently, the direction of drive, though the transmission is being reversed and the tendency of the coupling collar to slip or work out of its driving position, is increased.

It is an object of the present invention to provide a transmission coupling device wherein vibration and its own working action tend to move it toward its coupling position rather than away from its coupling position so that it is positively held in operation except when it is purposely shifted. The manner of accomplishing this object and further objects and advantages of the invention will be most readily understood upon reading the following description wherein reference is made to the accompanying drawings for an illustration of a preferred embodiment of the invention.

In the drawings:

Fig. 1 is a longitudinal sectional view through a portion of a transmission having a coupling device constructed in accordance with this invention;

Fig. 2 is a sectional view taken on the line 2—2 of Fig. 1; and

Fig. 3 is an enlarged developed fragmentary view taken on line 3—3 of Fig. 1, which line intersects the pitch line of the coupling gear illustrated in Fig. 1, and extending through coupling teeth on the transmission gears.

2

Referring first to Fig. 1 of the drawings, the transmission drive shaft is illustrated at 10 as having one end journaled in a bearing 11 supported by a transmission housing wall, a portion of which is illustrated at 12. The end of the drive shaft 10 is provided with a flange 13 by means of which the driving connection is established with the crankshaft of an engine or the like. Supported for rotation relative to the drive shaft 10 are transmission gears 14 and 15. Each of the gears 14 and 15 normally rotate freely about bushings 16 which are splined to the drive shaft by means of the splines shown as extending throughout substantially its full length, and the gears are retained against endwise movement by suitable collar members 17. It is to be understood that each of the gears 14 and 15 meshes with another gear (not shown) and the other gears are carried by a driven shaft so that the drive ratio between the driving shaft and the driven shaft may be varied by selectively employing either gear 14 or 15 and its associated gears as is conventional practice in constant mesh transmissions.

A gear shaped coupling member 18, which is also conventional, is interposed between the gears 14 and 15 and a coupling collar 19 is employed for forming a driving connection between the coupling member 18, which is splined to and driven by the shaft 10, and either one or the other of the gears 14 and 15. The coupling collar 19 is provided with an internal ring of gear-like spline teeth 20 which register with the externally disposed teeth on the coupling member 18 to provide the connection by means of which the coupling collar is enabled to slide longitudinally of the shaft 10 and thus toward or away from either of the gears 14 and 15. The coupling collar is also internally toothed at opposite sides of the centrally disposed spline teeth 20 to provide a ring of internal clutch teeth 21 for registry with a gear 14 and a similar ring of clutch teeth 22 for registry with the gear 15.

Each of the gears 14 and 15 is provided with a hub-like extension carrying external rings of clutch teeth 23 and 24 respectively for engagement with the clutch rings 21 and 22 on the coupling collar. Longitudinal movement of the coupling collar to a central or neutral position or to driving engagement with either of the gears 14 or 15 is accomplished in a conventional manner by means of a shifting fork 25, also shown in Fig. 2 as having fingers or pads 26 engageable in a peripheral groove 27 of the coupling collar. A hand actuated shifting lever or other actuating means (not shown) is usually employed in connection with the shifting fork 25 for effecting the required movement thereof.

In Fig. 1, the coupling collar 19 is illustrated as having been shifted to the left wherein its ring of clutch teeth 21 is in mesh with the external ring of clutch teeth 23 on the gear 14 so that rotation of the shaft 18 is imparted through the member 18 and coupling collar 19 to the gear 14, while the gear 15 is free to remain idle as the shaft rotates. Upon manipulation of the shifting fork, the coupling collar may be moved to the right for establishing similar driving connection with the gear 15 or it may be held in an intermediate position where neither of the gears 14 and 15 are being driven.

Considerable difficulty has been experienced in the operation of transmissions of this kind because of the fact that the driving pressure between the engaged clutch teeth as illustrated at 21 and 23 in Fig. 1 tends, particularly after such teeth have become slightly worn, to force the coupling collar 19 toward its neutral position with the result that it slips out of engagement with the gear 14 during operation. Efforts to overcome this fault by providing stops of various kinds have been unsuccessful and not desirable in that such stop means cause excessive wear and friction of other parts. For example, if the shifting fork 25 is locked in a position which prevents the clutch collar 19 slipping towards its neutral position, the clutch collar, which is rotating, will engage the pads 26 of the shifting fork and wear them away by frictional contact in a relatively short period of time. Furthermore, when such stop means are employed, the shifting fork 25, being relied upon to retain the coupling collar 19 in place, must be of unduly heavy construction and must be of a size which enables it to contact the groove in the coupling collar at diametrically opposite positions. The present invention provides for retaining the coupling collar in its shifted position without the use of such auxiliary stop means and entirely by virtue of its own construction so that the duty of the shifting fork is relatively light and a smaller and lighter weight construction may be employed wherein the pads 26 engage the groove of the coupling collar at no more than the 120° spacing as is illustrated in Fig. 2 of the drawings.

The manner in which the clutch teeth 21 and 22 of the coupling collar and the clutch teeth 23 and 24 of the gears 14 and 15 respectively are formed to insure that the coupling collar will not accidentally slip out of its coupling position is best illustrated in Fig. 3. In this figure all of the clutch teeth 21, 22, 23, and 24 are shown as having a tapered or wedge like shape provided by cutting the teeth helically and reversing the direction of the helix on opposite sides of each tooth. The cutting is done in such a manner that the wedge like shape of the tooth leaves its largest at its outer or leading end or the end which first enters into meshing engagement with the teeth with which it cooperates. This may also be described as inclining the helix angle of the teeth inwardly away from their leading ends. Thus, as the central spline teeth 20 slide longitudinally between the teeth of the coupling gear 18 to the leftward position, which is illustrated in Fig. 3, the clutch teeth 21 come into mesh with the clutch teeth 23 of the gear 14 in such a manner that their engaging faces are inclined in a direction to cause them to tend to slide inwardly or toward engagement rather than outwardly toward the neutral position of the coupling collar. Consequently, even though the teeth may have become slightly worn and even though they are subjected to excessive pressure in engagement due to an unusual load, there is no tendency for them to slide out of engagement, but rather the heavier the pressure to which they are subjected, the more they will tend securely to retain their position of engagement. As each of the clutch teeth on the coupling collar, as well as each of the meshing clutch teeth on the gear 14 driven thereby, has its sides equally and oppositely inclined, the same effect is produced regardless of the direction of drive, as, should the direction of drive be reversed from that shown in Fig. 3, the backlash or small space existing between the teeth would be taken up and the same effect would be obtained when their opposite faces came into engagement.

Both the coupling collar teeth and the gear teeth with which they engage are shown as being alternately long and short at their faces of first engagement as is conventional practice in transmissions of this kind for the purpose of facilitating engagement of the teeth as they are brought together.

The tendency of the coupling collar to continue its movement after it has become engaged is limited without exerting pressure against the shifting fork 25 by forming the splined teeth 20 somewhat longer than the clutch teeth 21 and 22 so that they abut and bear against a face 32 formed on the hub portion of each of the gears 14 and 15. This limits the movement of the coupling collar either to the left or the right at a point where the clutch teeth are fully engaged.

When the coupling collar is in its neutral position, all of the teeth 20, 21, and 22 are received in the space between the teeth of the coupling member 18. The root depth of all these teeth is the same so that they engage simultaneously with the teeth of the member 18. When the coupling collar is moved to the right or left, its clutch teeth 22 or 21, as well as its splined teeth 20, are in contact and in driving engagement with the teeth of the coupling member 18 so that a driving engagement of substantial length is always maintained. This provides a long bearing surface for the coupling collar on the coupling member to prevent it from twisting or cocking.

We claim:

1. In a transmission which comprises a shaft, a transmission gear rotatable thereon, a coupling member fixed thereon, and a coupling collar for connecting the coupling member and transmission gear, interengageable helically formed clutch teeth on the coupling collar and the transmission gear with the helix angle inclined inwardly away from the leading ends of the teeth to prevent accidental separation thereof.

2. In a transmission which comprises a shaft, a transmission gear rotatable thereon, a coupling member fixed thereon, and a coupling collar for connecting the coupling member and transmission gear, interengageable clutch teeth on the coupling collar and the transmission gear all formed with oppositely cut helical sides for engagement with each other and with the helix angle inclined inwardly away from the leading ends of the teeth whereby driving pressure in either direction will tend to maintain the collar and transmission gear in coupled condition.

3. In a transmission which comprises a shaft, a transmission gear rotatable thereon, a coupling member fixed thereon, and a coupling collar for connecting the coupling member and transmission gear, interengageable clutch teeth on the coupling collar and the transmission gear all formed with oppositely cut helical sides for engagement with each other and with the helix angle inclined inwardly away from the leading ends of the teeth whereby driving pressure in either direction will tend to maintain the collar and transmission gear in coupled condition, and means to limit the movement of the coupling collar toward the transmission gear.

4. In a transmission which comprises a shaft, a transmission gear rotatable thereon, a coupling member fixed thereon, and a coupling collar splined to the coupling member for connecting the coupling gear and transmission, an internal ring of gear like clutch teeth on the collar, an external ring of similar teeth on the gear, all of said teeth being formed with a right hand helix on one side and a left hand helix on the other side to provide interengaging surfaces with full volute contact at the pitch line with the helix angle inclined inwardly away from the leading ends of the teeth which tends to feed them toward their positions of engagement.

5. In a transmission which comprises a shaft, a transmission gear rotatable thereon, a coupling member fixed thereon, and a coupling collar splined to the coupling member for connecting the coupling gear and transmission, an internal ring of gear like clutch teeth on the collar, an external ring of similar teeth on the gear, all of said teeth being formed with a right hand helix on one side and a left hand helix on the other side to provide interengaging surfaces with full volute contact at the pitch line with the helix angle inclined inwardly away from the leading ends of the teeth which tends to feed them toward their positions of engagement, and shoulder means to limit the movement of the clutch collar toward the transmission gear.

6. In a transmission, a pair of transmission gears, a toothed coupling member between said gears, a coupling collar slidable on said member for selective engagement with said gears, said collar comprising three internal rings of gear like teeth of equal root depth for registry with the teeth of the coupling member, the outer two of said rings having teeth of helical form, and helically formed teeth on the transmission gears for registry therewith, the helix angle being inclined inwardly away from the leading ends of the teeth.

7. In a transmission, a pair of transmission gears, a toothed coupling member between said gears, a coupling collar slidable on said member for selective engagement with said gears, said collar comprising three internal rings of gear like teeth of equal root depth for registry with the teeth of the coupling member, the outer two of said rings having teeth of helical form, and helically formed teeth on the transmission gears for registry therewith, the helix angle on all teeth being inclined inwardly away from their leading ends, the inner ring of teeth on the coupling collar being longer than the outer rings and engageable with the transmission gears to limit the movement of the collar toward them.

GEORGE E. BURKS.
JOHN W. BRIDWELL.
GEORGE T. LUNDBERG.
ALFRED W. SIEVING.

REFERENCES CITED

The following references are of record in the file of this patent:

UNITED STATES PATENTS

| Number | Name | Date |
|---|---|---|
| 1,597,198 | Howell | Aug. 24, 1926 |
| 1,935,965 | Wahlberg | Nov. 21, 1933 |
| 2,001,856 | Thomson | May 21, 1935 |
| 2,410,511 | Letsinzer et al. | Nov. 5, 1946 |